(12) United States Patent
Sato et al.

(10) Patent No.: US 8,167,440 B2
(45) Date of Patent: May 1, 2012

(54) LIGHT SOURCE UNIT, LIGHT SOURCE APPARATUS AND PROJECTOR

(75) Inventors: Makoto Sato, Tachikawa (JP); Hideki Nakamura, Hamura (JP); Hiroshi Ogino, Kokubunji (JP)

(73) Assignee: Casio Computer Co., Ltd., Tokyo (JP)

( * ) Notice: Subject to any disclaimer, the term of this patent is extended or adjusted under 35 U.S.C. 154(b) by 58 days.

(21) Appl. No.: 12/825,642

(22) Filed: Jun. 29, 2010

(65) Prior Publication Data

US 2010/0328633 A1 Dec. 30, 2010

(30) Foreign Application Priority Data

Jun. 30, 2009 (JP) ................................ 2009-155458

(51) Int. Cl.
*G03B 21/28* (2006.01)
(52) U.S. Cl. ........ 353/99; 353/84; 362/217.08; 362/260
(58) Field of Classification Search .................... 353/31, 353/32, 38, 84, 98, 99, 121; 362/84, 217.08, 362/235, 260
See application file for complete search history.

(56) References Cited

U.S. PATENT DOCUMENTS

| 2004/0225222 A1* | 11/2004 | Zeng et al. | ................. | 600/476 |
| 2006/0268231 A1* | 11/2006 | Gil et al. | ...................... | 351/221 |

FOREIGN PATENT DOCUMENTS

| CN | 101393382 A | 3/2009 |
| JP | 2003-031872 A | 1/2003 |
| JP | 2004-014367 A | 1/2004 |
| JP | 2004-220015 A | 8/2004 |
| JP | 2004-341105 A | 12/2004 |
| JP | 2005-284185 A | 10/2005 |
| JP | 2007-218956 A | 8/2007 |
| JP | 2008-028019 A | 2/2008 |
| JP | 2008-052070 A | 3/2008 |

OTHER PUBLICATIONS

Decision to grant a Patent dated Feb. 24, 2011 (and English translation thereof) in counterpart Japanese Application No. 2009-155458.
Japanese Office Action (Notification of Reasons for Refusal) dated Jan. 6, 2011 (and English translation thereof) in counterpart Japanese Application No. 2009-155458.
Chinese Office Action dated Apr. 27, 2011 (and English translation thereof) in counterpart Chinese Application No. 201010220845.3.

* cited by examiner

*Primary Examiner* — Francis M Legasse, Jr.
(74) *Attorney, Agent, or Firm* — Holtz, Holtz, Goodman & Chick, PC

(57) ABSTRACT

A light source unit includes a light source group wherein light sources are arranged into rows and columns so as to form a planar configuration and a primary reflecting mirror group disposed on an optical axis of the light source group to reflect light beams emitted from the light source group as light beams whose sectional areas are reduced in a column direction by narrowing intervals between light beams emitted from the light sources making up the rows of the light source group, the primary reflecting mirror group includes different strip-like reflecting mirrors disposed on optical axes of light beams emitted from the rows of the light source group in a step-like fashion, and the reflecting mirrors are disposed to eliminate intervals between reflected light beams from the reflecting mirrors, thereby making it possible to reduce the sectional areas of the light beams.

9 Claims, 10 Drawing Sheets

US 8,167,440 B2

LIGHT SOURCE UNIT, LIGHT SOURCE APPARATUS AND PROJECTOR

CROSS-REFERENCE TO RELATED APPLICATIONS

This application is based upon and claims the benefit of priority under 35 USC 119 of Japanese Patent Application No. 2009-155458 filed on Jun. 30, 2009, the entire disclosure of which, including the description, claims, drawings and abstract, is incorporated herein by reference.

BACKGROUND OF THE INVENTION

1. Field of the Invention

The present invention relates to a light source unit including a plurality of light sources, a light source apparatus including the light source unit, and a projector including the light source apparatus.

2. Description of the Related Art

In these days, data projectors are used in many cases as image projection apparatuses which project screens or video images of personal computers and further images based on image data stored in memory cards on to a screen. These projectors are such that light emitted from a light source is concentrated on a micromirror device called a DMD (Digital Micromirror Device) or a liquid crystal plate for displaying a color image on to the screen.

In projectors of the type described above, conventionally, projectors using a high-intensity discharge lamp as a light source have been the mainstream of projectors. In recent years, however, there have been made many developments and proposals on light source units which use, as a light emitting device of a light source apparatus, a semiconductor light emitting device such as a light emitting diode (LED), a laser diode (LD) or an organic EL.

For example, Japanese Unexamined Patent Publication No. 2004-220015 proposes a light source apparatus in which light emitting devices are disposed in a matrix-like configuration so as to increase a quantity of light. However, in the invention described in the patent document, the light emitting area is increased, which increases the value of Etendue. Because of this, there is much light which becomes unnecessary or is not used, leading to a problem that the utilization efficiency of light emitted from the light emitting diodes is reduced. Note that Etendue is a value which represents the spatial expansion of effective light as a product of area and solid angle and which is preserved in the optical system.

Then, Japanese Unexamined Patent Publication No. 2004-341105 proposes a light source apparatus comprising a light emitting wheel in which fluorescent materials are disposed in a circumferential direction and an ultraviolet light emitting diode. In the proposal made in Japanese Unexamined Patent Publication No. 2004-341105, ultraviolet light is shone on to the light emitting wheel from a rear surface side thereof as excitation light, and fluorescent light emitted from a front surface side of the light emitting wheel is used as light source light.

In the invention described in Japanese Unexamined Patent Publication No. 2004-341105, in order to increase the quantity of fluorescent light, the output of the excitation light needs to be increased. Although there is a method for utilizing a plurality of ultraviolet light emitting diodes as a method for increasing the output of excitation light, as this occurs, since the number of bright points of the excitation light source is increased, there has been caused a problem that a large-scale light gathering lens becomes necessary to gather light beams emitted from the plurality of bright points to the fluorescent materials.

SUMMARY OF THE INVENTION

The invention has been made in view of the problem inherent in the related art and an object thereof is to provide a light source unit having a plurality of light sources which are arranged in a planar configuration, wherein cross-sectional areas of light beams which are emitted from a plurality of bright points can be reduced by narrowing intervals by mirrors at which light is emitted from the respective light sources, a light source apparatus comprising a light emitting wheel which utilizes light emitted from the light source unit as excitation light and light with a predetermined wavelength band, and a small and thin projector comprising the light source apparatus.

In the light source unit, the light source apparatus and the projector of the invention, there are provided a light source group in which a plurality of light sources are arranged in rows and columns which make up a planar configuration and a primary reflecting mirror group in which reflecting mirrors are disposed on optical axes of the light sources of the light source group so as to reflect light beams which are reduced from the light source group as light beams which are reduced in a column direction by narrowing intervals between rows of light beams which are emitted from the light source group.

BRIEF DESCRIPTION OF THE DRAWINGS

Although the invention will be understood sufficiently from the following detailed description of the invention and accompanying drawings which illustrate the same, the description and illustration of the invention will mainly be made for the sake of explanation of the invention, and hence, the scope of the invention is not limited at all by them. In the drawings.

DETAILED DESCRIPTION OF THE PREFERRED EMBODIMENT

Figure 1:
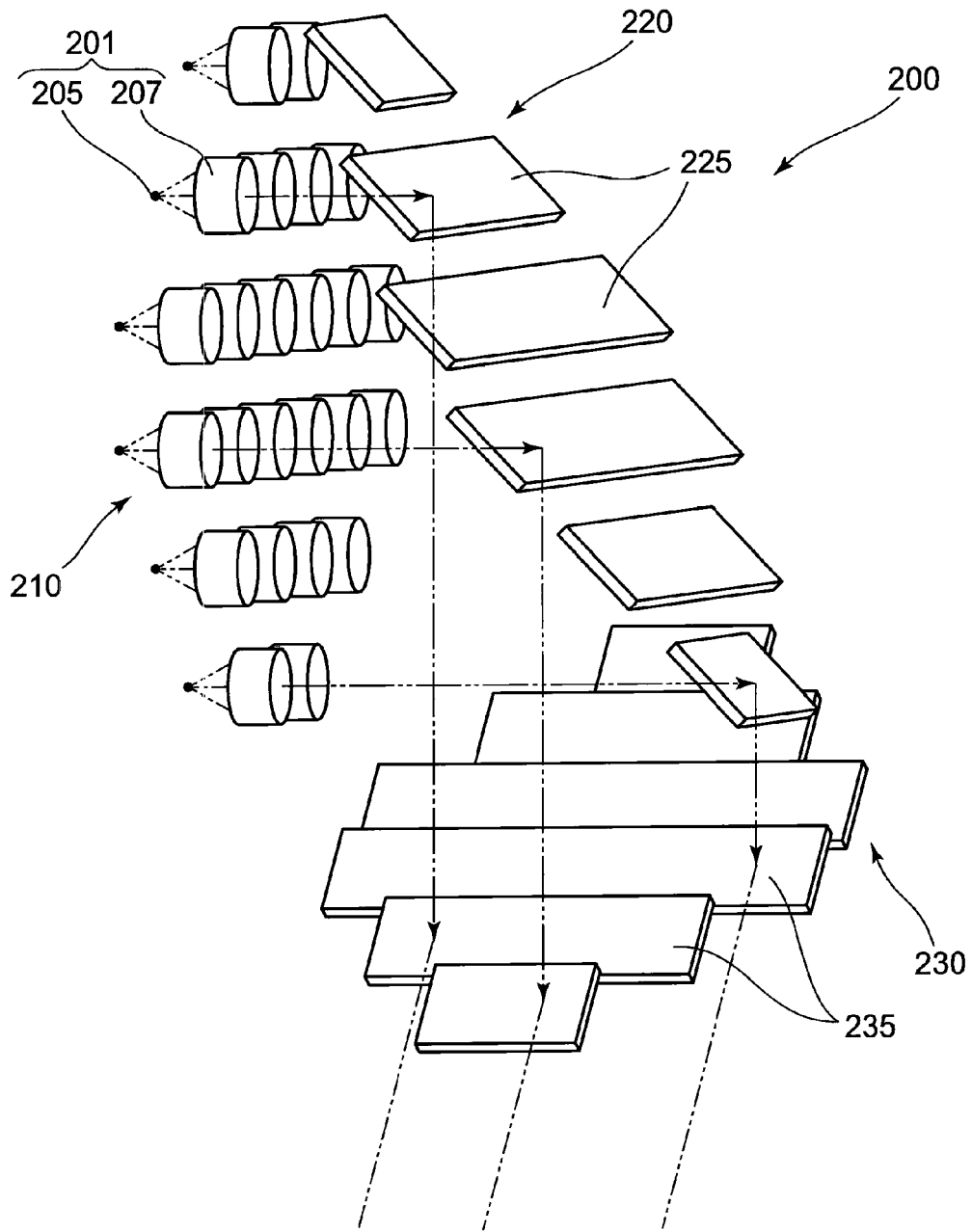
FIG. 1 is an exemplary diagram showing an external perspective view of a light source unit according to an embodiment of the invention.

Hereinafter, a preferred mode for carrying out the invention will be described by use of the accompanying drawings. However, in the following embodiment, although various technical limitations will be given which are preferred in carrying out the invention, the scope of the invention is not limited at all to embodiments which will be described in the following description and illustrated in the accompanying drawings.

A projector 10 of the invention includes a light source apparatus 63, a light guiding device 75, a light source side optical system 62, a display device 51, a projection side optical system 90, and a projector control means.

This light source apparatus 63 includes a light source unit 200, a light emitting wheel 71 disposed on an optical axis of a light beam emitted from the light source unit 200, a wheel motor 73 for driving to rotate the light emitting wheel 71, and a red light source 72 as a single-color light emitting device. Further, the light source apparatus 63 has a light gathering optical system for making an optical axis of a light beam emitted from the light emitting wheel 71 and an optical axis of a light beam emitted from the red light source 72 coincide with each other so that the light beams are gathered on to an incident surface of the light guiding device 75.

This light emitting wheel 71 includes at least a diffuse transmission area and a fluorescent reflecting area, and the diffuse transmission area and the fluorescent reflecting area are provided end to end in a circumferential direction. The diffuse transmission area is an area which transmits light emitted from the light source unit 200 as blue laser light in a defusing fashion. The fluorescent reflecting area is an area including a fluorescent material which receives light emitted from the light source unit 200 so as to emit light in a green wavelength band.

In addition, the light source unit 200 is made up of a light source group 210 in which a plurality of light sources 201 are arranged into rows and columns which make up a planar configuration and a primary reflecting mirror group 220 for reflecting light beams emitted from the light source group 210 as light beams whose cross-sectional areas are reduced in a column direction. This primary reflecting mirror group 220 is disposed on an optical axis of the light source group 210. The primary reflecting mirror group 220 is made up of a plurality of mirrors which are individually made equal in length to the number of columns of light sources so as to reflect light beams emitted from the light sources 201 which make up each of the rows of the light source group 210 by each of the plurality of reflecting mirrors which make up the primary reflecting mirror group 220 and is adapted to reflect light beams emitted from the light source group 210 as light beams whose cross-sectional areas are reduced in the column direction by narrowing intervals between light beams which are reflected by the respective reflecting mirrors.

In addition, the light source 201 is formed of a combination of a light emitting device 205 and a collimator lens 207 which converts light emitted from the light emitting device 205 into parallel light. The light source group 210 is made up of 24 light sources 201 which are arranged in six rows and four columns which form a rectangular configuration.

The primary reflecting mirror group 220 is made up of strip-like reflecting mirrors 225 which are individually disposed on optical axes of light beams emitted from the rows of the light source group 210 in a step-like fashion. The reflecting mirrors 225 are disposed so as to eliminate intervals between individual reflected light beams reflected thereon.

Figure 2:
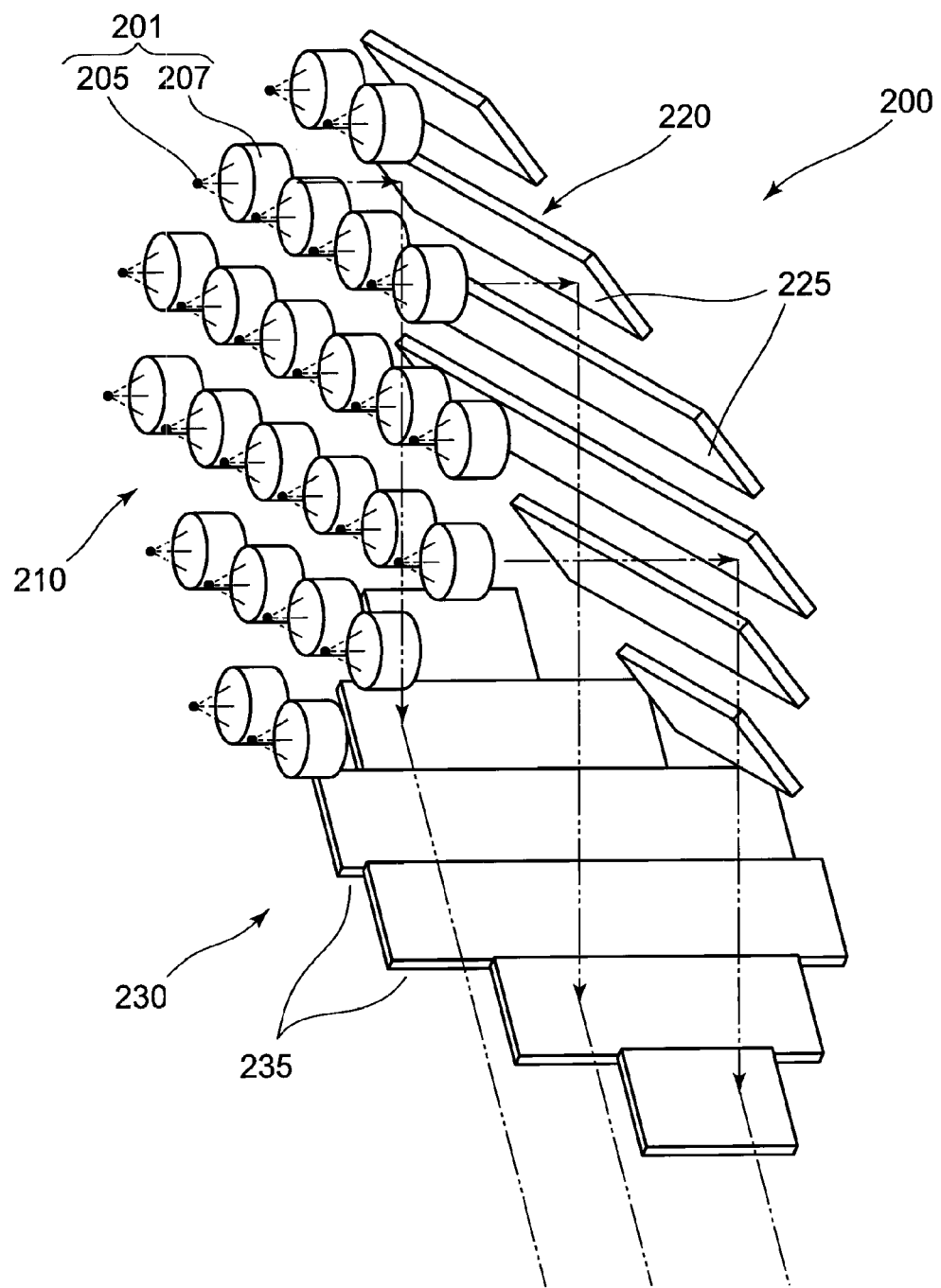
FIG. 2 is an exemplary diagram showing an external perspective view of the light source unit according to the embodiment of the invention.

Hereinafter, embodiments of the invention will be described in detail by reference to the drawings. FIGS. 1 and 2 are exemplary diagrams showing external perspective views of a light source unit 200 of the invention. As is shown in FIGS. 1 and 2, the light source unit 200 is made up of a light source group 210 in which a plurality of light sources 201 are arranged in rows and columns which make up a planar configuration, a primary reflecting mirror group 220 which are made up of a plurality of reflecting mirrors 225 which are individually disposed on optical axes of the rows of light sources 201 of the light source group 210, and a secondary reflecting mirror group 230 which is made up of a plurality of reflecting mirrors 235 which are disposed on optical axes of light beams which are reflected on the primary reflecting mirror group 220.

This light source unit 200 firstly converts light beams emitted from the light source group 210 into light beams whose cross-sectional areas are reduced in a column direction by the primary reflecting mirror group 220. Following this, the light source unit 200 varies the direction of the light beams emitted from the light source group 210 and reflected on the primary reflecting mirror group 220 to a direction which is at right angles to the primary reflecting mirror group 220 by the secondary reflecting mirror group 230. Namely, the light source unit 200 converts the light beams emitted from the light source group 210 into light beams whose cross-sectional areas are reduced in a row direction. In this way, the light source unit 200 can reduce the cross-sectional areas of light beams emitted from the light source group 210 without changing the diffuse angle of the light beams so emitted and can increase the density thereof. Note that the column direction denotes a vertical direction when FIG. 1 is viewed from the front, and the row direction denotes a horizontal direction in FIG. 1, which is a direction at right angles to the column direction on the plane on which the light source group 210 is arranged.

The light source 201 is made up of a combination of a light emitting device 205 which constitutes a point light source of a blue laser beam emitting device or the like and a collimator lens 207 which converts a light beam emitted from the light emitting device 205 into parallel light whose directivity is increased.

The light source group 210 is made up of 24 light sources 201 which are arranged in six rows and six columns so as to form an octagonal shape in which two opposing sides are parallel. Namely, in the light source group 210, two light sources 201 are disposed in a first row, four light sources 201 are disposed in a second row, six light sources 201 are disposed in a third row, six light sources 201 are disposed in a fourth row, four light sources 201 are disposed in a fifth row, and two light sources are disposed in a sixth row, the light sources 201 being disposed at regular intervals so as to provide a predetermined interval therebetween in each row. Similarly, the light sources 201 are also disposed in the same manner in the column direction so as to form an octagonal shape in which two opposing sides are parallel; two in a first column, four in a second column, six in a third column, six in a fourth column, four in a fifth column, and two in a sixth column in that order, and the light sources 201 are disposed at regular intervals so as to provide a predetermined interval therebetween in each column. The reason that the predetermined intervals are provided between the individual light sources 201 is to ensure a space where to dispose a substrate for each light source 201, a space for a holding member for holding each light source 201, and a space for wiring. In addition, providing the predetermined interval between the individual light sources 201 is intended to deal with heat produced by the light source 201.

The primary reflecting mirror group 220 is made up of six strip-like reflecting mirrors 225, that is, a number of reflecting mirrors 225 which is the same as the number of rows of light sources 201 in the light source group 210. These six reflecting mirrors 225 reflect individually light beams emitted from the light sources 201 which are disposed in the rows of the light source group 210 as light beams whose cross-sectional areas are reduced in the column direction by narrowing the respective intervals between the rows. In addition, these six reflecting mirrors 225 are made up of pairs of reflecting mirrors; a pair of reflecting mirrors 225 adapted to deal with two light sources and disposed to face the rows where two light sources 201 are disposed, a pair of reflecting mirrors 225 formed longer than the reflecting mirror 225 for two light sources so as to deal with four light sources and disposed to face the rows where four light sources are disposed, and a pair of reflecting mirrors 225 formed longer than the reflecting mirror 225 for four light sources to deal with six light sources and disposed to face the rows where six light sources are disposed.

The primary reflecting mirror group 220 is made up of the strip-like reflecting mirrors 225 having different lengths which are disposed individually on the optical axes of light beams emitted from the respective rows of the light source group 210 in the step-like fashion so as to form an angle of 45 degrees with respect to the optical axes. In addition, the reflecting mirrors 225 are disposed so as to eliminate intervals or spaces defined between reflected light beams from the reflecting mirrors 225 or to narrow the intervals between the reflecting mirrors 225 in the direction of the optical axes of the light beams emitted from the light source group 210.

Namely, the reflecting mirrors 225 for two light sources are disposed on the optical axes of the row where the two light sources 201 are disposed so as to form the angle of 45 degrees with respect to the optical axes, the reflecting mirrors 225 for four light sources are disposed on the optical axes of the row where the four light sources are disposed so as to form the angle of 45 degrees with respect to the optical axes, and the reflecting mirrors 225 for six light sources are disposed on the optical axes of the row where the six light sources are disposed so as to form the angle of 45 degrees with respect to the optical axes.

In the primary reflecting mirror group 220, the reason that the reflecting mirrors 225 are disposed in the step-like fashion is to prevent the interference of light beams reflected on the individual reflecting mirrors 225 with the other reflecting mirrors 225. In addition, the reason that the reflecting mirrors 225 are disposed so as to eliminate the intervals between reflected light beams from the individual reflecting mirrors 225 is to reflect light beams emitted from the light source group 210 as light beams whose cross-sectional areas are reduced in the column direction by eliminating spaces defined between the respective rows of the light source group 210.

The secondary reflecting mirror group 230 is made up of six strip-like reflecting mirrors 235 or is made up of a number of reflecting mirrors 235 which is the same as the number of columns of light sources 201 in the light source group 210. These six reflecting mirrors 235 are made up of strip-like reflecting mirrors 235 having different lengths which are disposed on optical axes of the light beams which are emitted from the respective rows of the light source group 210 and are reflected on the primary reflecting mirror group 220 in a step-like fashion. As with the primary reflecting mirror group 220, these six reflecting mirrors 235 are made up of pairs of reflecting mirrors; a pair of reflecting mirrors 235 adapted to deal with two light sources and disposed to face the columns where two light sources 201 are disposed in the column direction, a pair of reflecting mirrors 235 formed longer than the reflecting mirror 235 for two light sources so as to deal with four light sources and disposed to face the columns where four light sources are disposed, and a pair of reflecting mirrors 235 formed longer than the reflecting mirror 235 for four light sources to deal with six light sources and disposed to face the columns where six light sources are disposed.

Further, the individual reflecting mirrors 235 are disposed so as to form an angle of 45 degrees with respect to optical axes of the light beams which are emitted from the rows of the light source group 210 and are reflected on the primary reflecting mirror group 220. Namely, the secondary reflecting mirror group 230 varies the direction of the optical axes of the light beams which are reflected on the primary reflecting mirror group 220 to a direction which is at right angles to the optical axis of the light beams reflected on the primary reflecting mirror group 220 and the optical axes of the light beams emitted from the primary light source group 210. Further, the reflecting mirrors 235 are disposed so as to eliminate intervals between reflected light beams from the individual reflecting mirrors 235 or to narrow intervals between the individual reflecting mirrors 235 in the direction of the optical axes of the reflected light beams reflected on the primary reflecting mirror group 220.

In addition, this secondary reflecting mirror group 230 not only reduces cross-sectional areas of the light beams in the row direction but also increases the density of the light beams by reducing the length in the row direction of the light beams emitted from the light source group 210. Namely, according to the secondary reflecting mirror group 230, in the cross sections of light beams emitted from the light source group 210, the length in the direction which is at right angles to the direction in which the light beams are reduced in the primary reflecting mirror group 220 can be reduced. Consequently, the light source unit 200 of the embodiment can emit light beams whose cross-sectional areas are small and which is high in luminance.

Note that while the pluralities of reflecting mirrors 225, 235 are used which are different in length so as to match the numbers of light sources 201 which are arranged in the corresponding rows or corresponding columns, all the reflecting mirrors 225, 235 may have the same size and the size of the reflecting mirrors 225, 235 can be changed freely so as to match the place where to dispose the light source unit 200 and the configuration thereof in an electric appliance which utilizes the light source unit 200.

Figure 3:
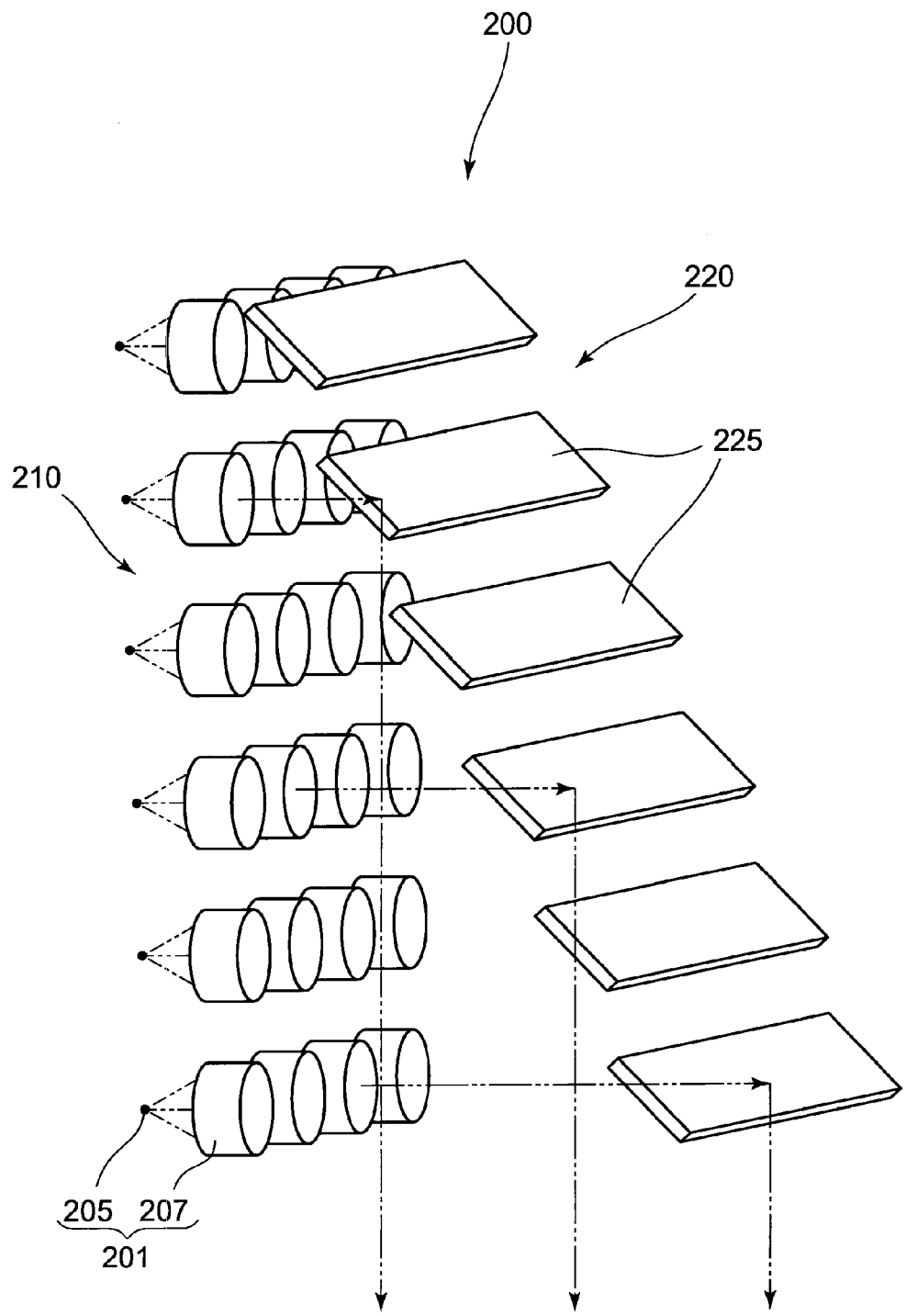
FIG. 3 is an exemplary diagram showing an external perspective view of a light source unit according to another embodiment of the invention.

Next, another embodiment of a light source unit 200 will be described which is configured so as to reduce cross-sectional areas of light beams which are emitted from a light source group 210. FIG. 3 is an exemplary diagram showing an external perspective view of a light source unit 200 according to another embodiment of the invention. While the light emitted from the light source group 210 is reduced in the two directions in the light source unit 200 described in the previous embodiment, as is shown in FIG. 3, it is also possible to configure the light source unit 200 so as to reduce cross-sectional areas of light beams emitted from the light source group 210 in one direction only by disposing a primary light source group 220 on an optical axis of the light source group 210.

The light source unit 200 so configured is made up of the light source group 210 and the primary reflecting mirror group 220 which is disposed on optical axes of light beams which are emitted from the light source group 210 so as to vary the optical axes through 90 degrees. In addition, this light source group 210 is made up of a plurality of light source members in each of which a plurality of light sources 201 are disposed linearly so as to lie close to each other, and the plurality of light source members are arranged into a planar configuration while being disposed at regular intervals so as to form heat dissipating spaces between the individual light source members. 24 light sources 201, which are each made up of a combination of a light emitting device 205 and a collimator lens 207, are arranged in six rows and four columns at equal intervals so as to form a rectangular configuration.

The primary reflecting mirror group 220 is made up of six strip-like reflecting mirrors 225. In addition, the primary reflecting mirror group 220 is made up of the six strip-like reflecting mirrors 225 which have the same size and which are disposed on optical axes of light beams which are emitted from the respective rows of the light source group 210 so as to form an angle of 45 degrees in a step-like fashion with respect to the optical axes. In addition, these six reflecting mirrors 225 reflect light beams emitted from the light sources 201 which are disposed in the respective rows of the light source group 210 as light beams whose cross-sectional areas are reduced in a column direction by narrowing intervals between the individual rows. Further, these reflecting mirrors 225 are disposed so as to eliminate intervals between reflected light beams from the individual reflecting mirrors 225 or to narrow intervals between the individual reflecting mirrors 225 in the direction of optical axes of the light beams from the light source group 210.

In an apparatus in which a plurality of light sources are provided side by side, in the event that heat dissipating spaces or the like are required between the plurality of light sources, the light sources are disposed at predetermined intervals. In such an apparatus, however, since the light sources are disposed so as to ensure predetermined intervals therebetween, cross-sectional areas of light beams emitted from the plurality of light sources are increased. The light source unit 200 of this embodiment is such as to be able to emit light beams emitted from the light source group as light beams whose cross-sectional areas are reduced so as to increase the density thereof by the primary reflecting mirror group 220 even in the event that the plurality of light sources are disposed at predetermined intervals.

Figure 4:
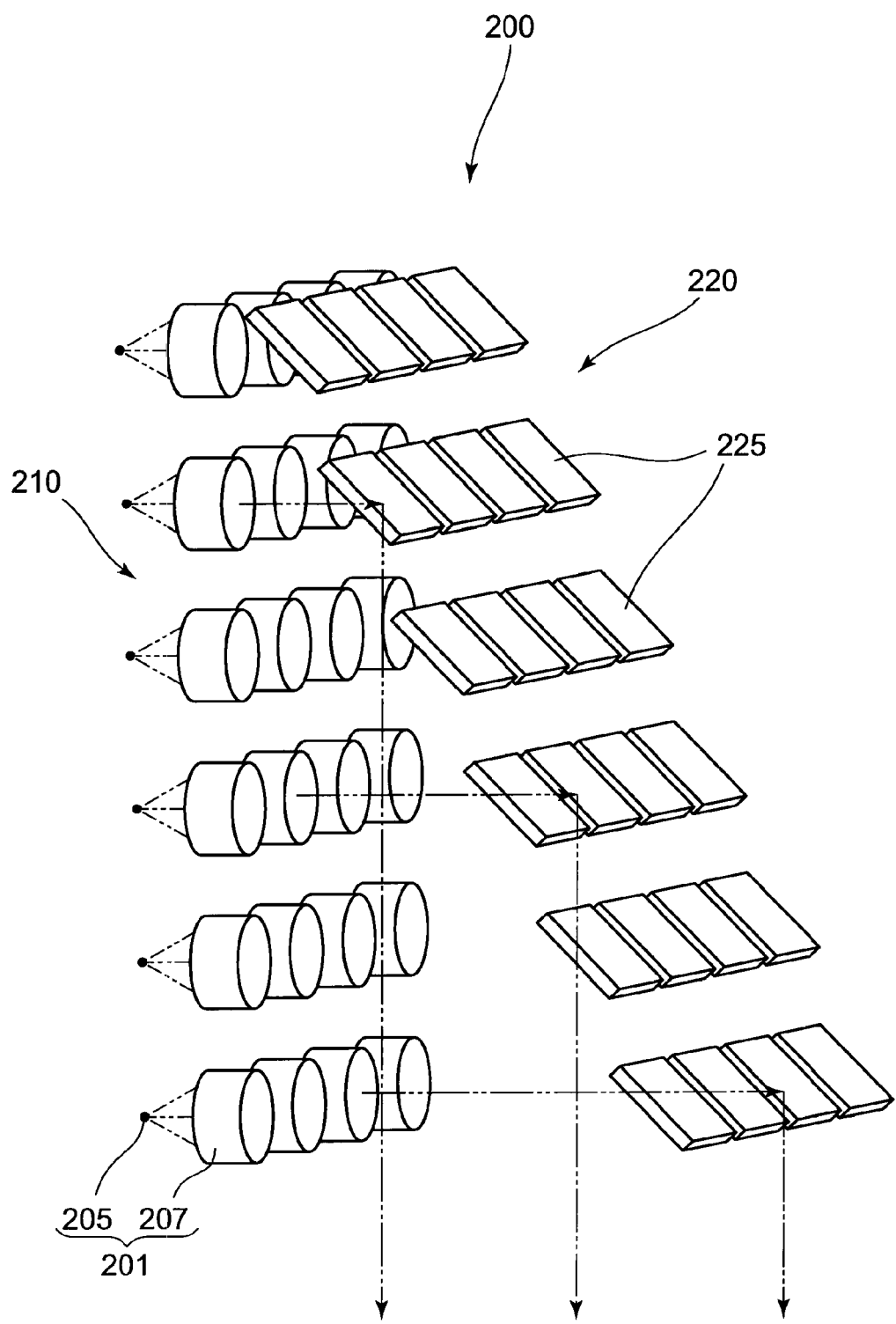
FIG. 4 is an exemplary diagram showing an external perspective view of a light source unit according to a further embodiment of the invention.

In addition, a light source unit 200 according to a further embodiment of the invention will be described. FIG. 4 is an exemplary diagram showing an external perspective view of a light source unit 200 of the further embodiment. The light source unit 200 of this embodiment is similar to that shown in FIG. 3 in that a primary reflecting mirror group 220 is disposed on an optical axis of a light source group 210 so as to reduce cross-sectional areas of light beams in one direction only. However, in the light source unit 200 of this embodiment, the primary reflecting mirror group 220 is configured, as is shown in FIG. 4, so that light emitted from one light source 201 is reflected by one reflecting mirror 225.

Namely, in the light source unit 200 of this embodiment, the primary reflecting mirror group 220 includes a number of reflecting mirrors 225 which is the same as the number of light sources 201 in the light source group 210. Individual reflecting mirrors 210 are disposed on optical axes of the individual light sources 201 of the light source group 210 so as to be inclined at the same angle. Further, the individual reflecting mirrors 225 are disposed so as to eliminate intervals between reflected light beams from the individual reflecting mirrors 225 or to narrow intervals between the individual reflecting mirrors 225 in the direction of the optical axes of the light source group 210.

While the individual reflecting mirrors 225 in the light source unit 200 of this embodiment are arranged so as to be inclined at the same angle, the individual reflecting mirrors 225 can be arranged so as to be inclined at different angles to gather light emitted from the individual light sources 201 on to a predetermined single point.

Figure 5:
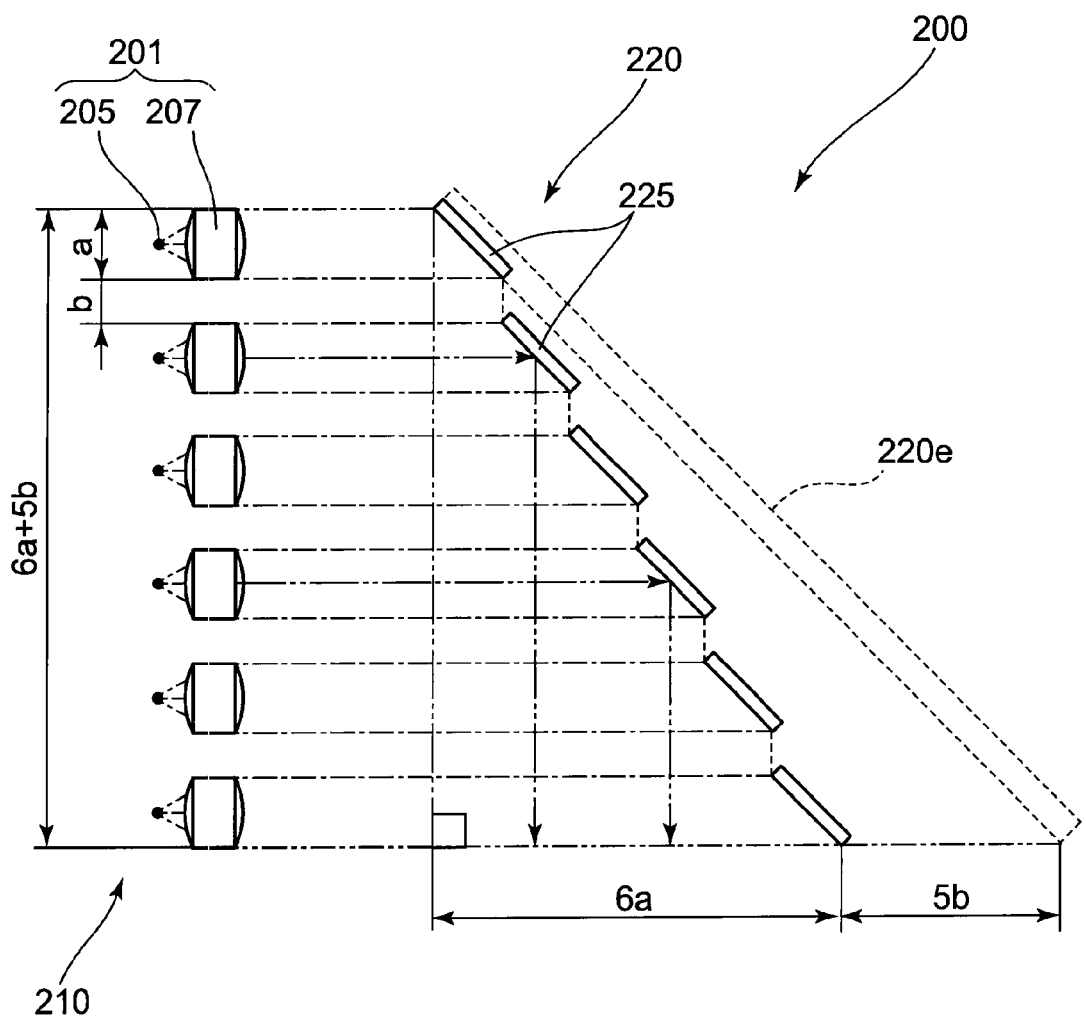
FIG. 5 is an explanatory diagram illustrating a principle of reducing cross-sectional areas of light beams in the light source unit according to the embodiment of the invention.

Next, in the respective embodiments that have been described heretofore, a principle of reducing the cross-sectional areas of light beams emitted from the light source group 210 by the reflecting mirror groups 220, 230 will be described by taking the primary reflecting mirror group 220 for an example. FIG. 5 is a reference diagram which explains the principle of reducing the cross-sectional areas of light beams at the primary reflecting mirror group 220 of the embodiments. Note that light beams emitted from the collimator lenses 207 of the light sources 201 are all parallel light.

Assuming that a diameter of the collimator lens 207 of the light source 201 is a and an interval between the light sources 201 in the adjacent rows is b, as is shown in FIG. 5, an overall length of the light source group 210 in the column direction becomes 6a+5b due to there being six columns. In addition, since light beams emitted from the collimator lenses 207 of the light sources 201 all become parallel light, an overall length in the column direction in the cross section of a light beam emitted from the light source group 210 also becomes 6a+5b.

In the event that a light beam emitted from the light source group 210 described above is reflected at right angles in the column direction by a single reflecting mirror 220e, an overall length in the column direction of a cross section of the light beam which is reflected on the reflecting mirror 220e becomes 6a+5b. In the embodiments, however, the strip-like reflecting mirrors 225 are disposed for the respective rows, and these reflecting mirrors 225 are disposed so as to narrow the intervals between the individual reflecting mirrors 225 in the direction of the optical axis of the light source group 210 by these reflecting mirrors 225. Consequently, light beams which are reflected by the individual reflecting mirrors 225 become light beams in which the intervals b between the individual light sources 201 in the light source group 210 are eliminated, and hence, a length of the light beams in the column direction becomes 6a.

According to the light source unit 200 configured as has been described heretofore, by providing the primary reflecting mirror group 220 which reflects the light beams emitted from the light sources 201 in the respective rows of the light source group 210 as light beams whose cross-sectional areas are reduced in the column direction by narrowing the intervals between the individual rows, light emitted from the light source group 210 can be made into the light beam whose cross-sectional area is reduced in the predetermined one direction, thereby making it possible to reduce the Etendue of the light source unit 200.

In addition, according to the light source unit 200 in which the primary reflecting mirror group 220 is made up of the plurality of reflecting mirrors 225 which are arranged on the optical axes of the light beams which are emitted from the individual rows of the light source group 210 in the step-like fashion and the respective reflecting mirrors 225 are arranged so as to eliminate the intervals between the individual light beams from the reflecting mirrors 225, the interference of the light beams reflected on the individual reflecting mirrors 225 with the other reflecting mirrors 225 can be prevented and the light beams emitted from the light source group 210 can be reflected on the individual reflecting mirrors 225 as light beams in which the intervals between the light sources 201 in the direction of the respective rows of the light source group 210 are eliminated.

Further, according to the light source unit 200 in which the primary reflecting mirror group 220 is made up of a number of strip-like reflecting mirrors 225 which is the same as the number of rows of light sources 201 in the light source group 210 and the individual reflecting mirrors 225 are disposed so as to be inclined at the same angle to become parallel to the direction of the rows of the light source group 210, the light beams emitted form the collimator lenses 207 of the light sources 201 can be emitted as light beams whose cross-sectional areas are reduced in the predetermined one direction while maintaining the diffuse angle at which the light beams emitted from the collimator lenses 207, thereby making it possible to reduce the Etendue of the light source unit 200.

In addition, according to the light source unit 200 in which the primary reflecting mirror group 220 is made up of a number of reflecting mirrors 225 which is the same as the number of light sources 201 in the light source group 210 and the individual reflecting mirrors are disposed on the optical axes of the individual light sources 201 of the light source group 210 so as to be inclined at the predetermined angle with respect to the optical axes, since the respective light sources 201 are given their corresponding reflecting mirrors 225, even in the event that the light sources 201 are disposed irregularly in the light source group 210, the cross-sectional areas of the light beams can easily be reduced.

Further, according to the light source unit 200 which includes the secondary reflecting mirror group 230 which is provided on the optical axes of the light beams which are reflected by the primary reflecting mirror group 220, since the light emitted from the light source group 210 can be made into the light beams whose cross-sectional areas are reduced in the direction which is at right angles to the direction in which the light emitted from the light source group 210 is reflected by the primary reflecting mirror group 220, the cross-sectional areas of the light beams can be reduced in the two directions which are at right angles to each other on the plane.

In addition, according to the light source unit 200 in which as with the primary reflecting mirror group 220, the secondary reflecting mirror group 230 is made up of the plurality of strip-like reflecting mirrors 235 which are disposed so as to eliminate the intervals between the individual reflected light beams reflected from the individual reflecting mirrors 235, not only can the interference of the light beams reflected on the individual reflecting mirrors 235 with the other reflecting mirrors 235 be prevented advantageously in a similar manner to that of the primary reflecting mirror group 220 that has been described above, but also the light beams reflected on the primary reflecting mirror group 220 can be reflected as the light beams in which the intervals between the light sources 201 of the light source group 210 can be eliminated in the column direction.

In addition, according to the light source unit 200 of the embodiments, not only can the cross-sectional areas of the light beams emitted from the light source group 210 be reduced in the two directions which are at right angles to each other but also the density thereof can be increased by the primary reflecting mirror group 220 and the primary reflecting mirror group 230. Additionally, by utilizing this light source unit 200, not only can a small lens with a small diameter be used as an optical system, but also light with high luminance can be emitted, thereby making it possible to provide a small and thin electric appliance.

Note that the invention is not limited to the configuration in which the primary reflecting mirror group 220 and the secondary reflecting mirror group 230 are disposed at the angle of 45 degrees with respect to the optical axes of the light sources 201, and hence, it is good enough to control the distance and angle from the light sources 201 so as to reduce the intervals between the rows or columns of the light source group 210.

In addition, by adopting the configuration in which the light source 201 is made up of the combination of the light emitting device 205 and the collimator lens 207, since light emitted from the light emitting device 205 can be converted into parallel light by the collimator lens 207, the utilization efficiency of light emitted from the light source 201 can be increased.

Further, by adopting the construction in which the light source group 210 is made up of 24 light sources 201 which are arranged in six rows and six columns so as to form an octagonal shape in which two facing sides become parallel to each other, since the cross-sectional shape of the light beam emitted from the light source group 210 can be made into a shape closely matching a circular shape, the density of light emitted from the light source unit 200 can be made uniform.

In addition, according to the light source unit 200 of the embodiments, even in the event that the light source group 210 is constructed so as to be made up of 24 light sources 201 which are arranged in six rows and four columns which form the rectangular configuration, a change in cross-sectional shape of the light beam can be facilitated in such a way that there can be provided a light beam which has a cross-sectional shape matching a configuration of a display device having an aspect ratio of 4 to 3 or a light beam which as a square cross-sectional shape.

Figure 6:
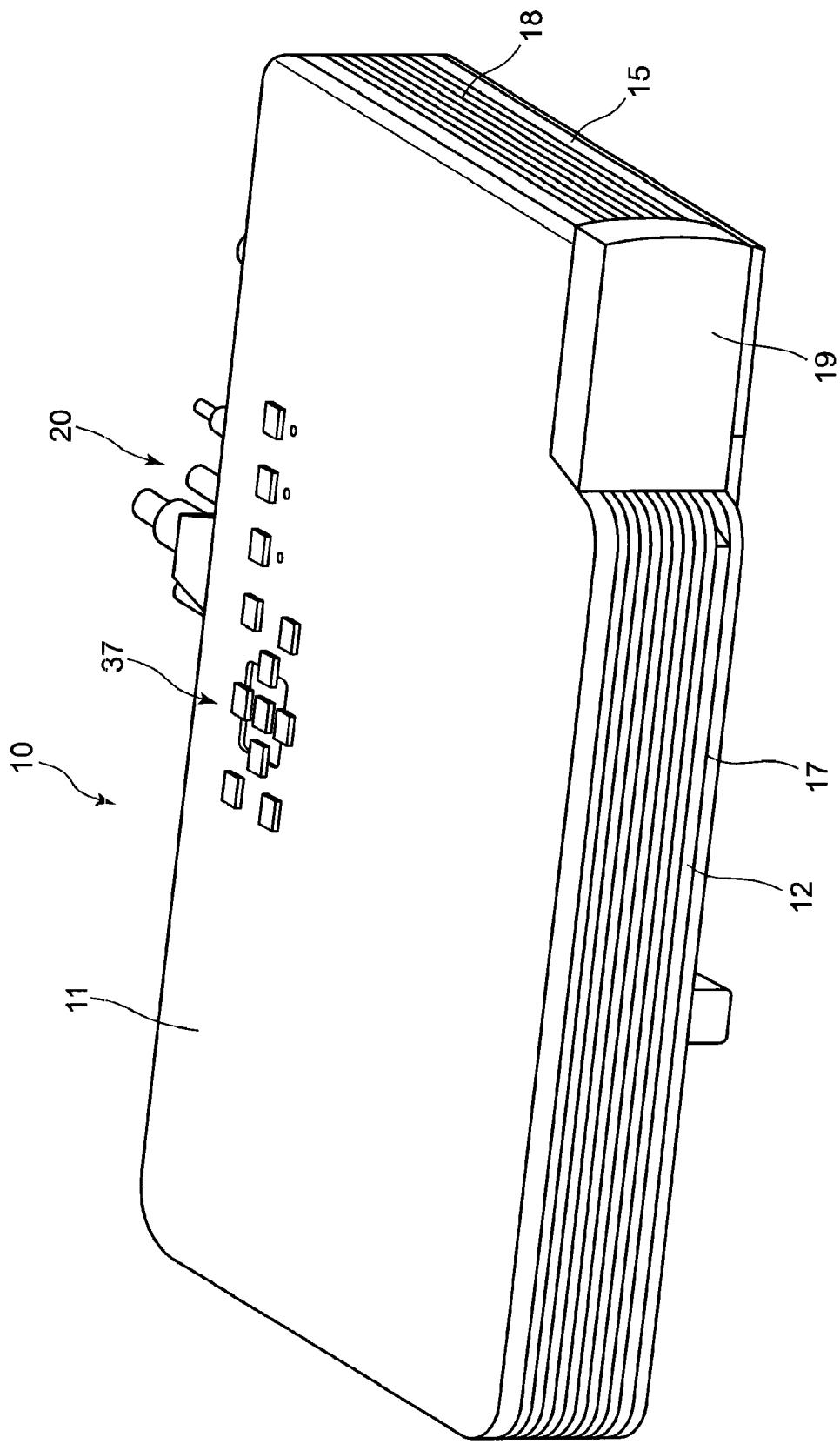
FIG. 6 is an external perspective view showing an embodiment of a projector according to an embodiment of the invention.

Next, the projector 10 will be taken for an example in describing an electric appliance which utilizes the light source unit 200 that has been described heretofore. FIG. 6 is a perspective view showing an external appearance of the projector 10. When used in this embodiment, left and right denote left and right directions with respect to a projecting direction, and front and rear denote front and rear directions with respect to a traveling direction of a light beam. As is shown in FIG. 6, the projector 10 has a substantially rectangular parallelepiped shape and has a lens cover 19 which covers a projection port which lies to a side of a front panel 12 which is referred to as a front side panel of a main body case, as well as a plurality of outlet holes 17 in the front panel 12. Further, although not shown, the projector 10 includes an Ir reception part for receiving a control signal from a remote controller.

In addition, a keys/indicators part 37 is provided on an upper side panel 11 which constitutes the main body case, and disposed on this keys/indicators part 37 are keys and indicators which include a power supply switch key, a power indicator which informs whether the power supply is on or off, a projection switch key which switches on or off projection, an overheat indicator which informs of an overheat condition when the light source unit, the display device or the control circuit overheats and the like.

Further, provided on a back side of a back side panel of the main body case are an input/output connectors part where USB terminals, an image signal input D-SUB terminal, an S terminal, an RCA terminal and the like are provided and various types of terminals 20 including a power supply adaptor plug and the like. A plurality of inlet holes 18 are formed in proximity to lower portions of a right-hand side panel 14 which constitutes a side panel, not shown, of the main body case and a left-hand side panel 15 which is a side panel shown in FIG. 6.

Figure 7:
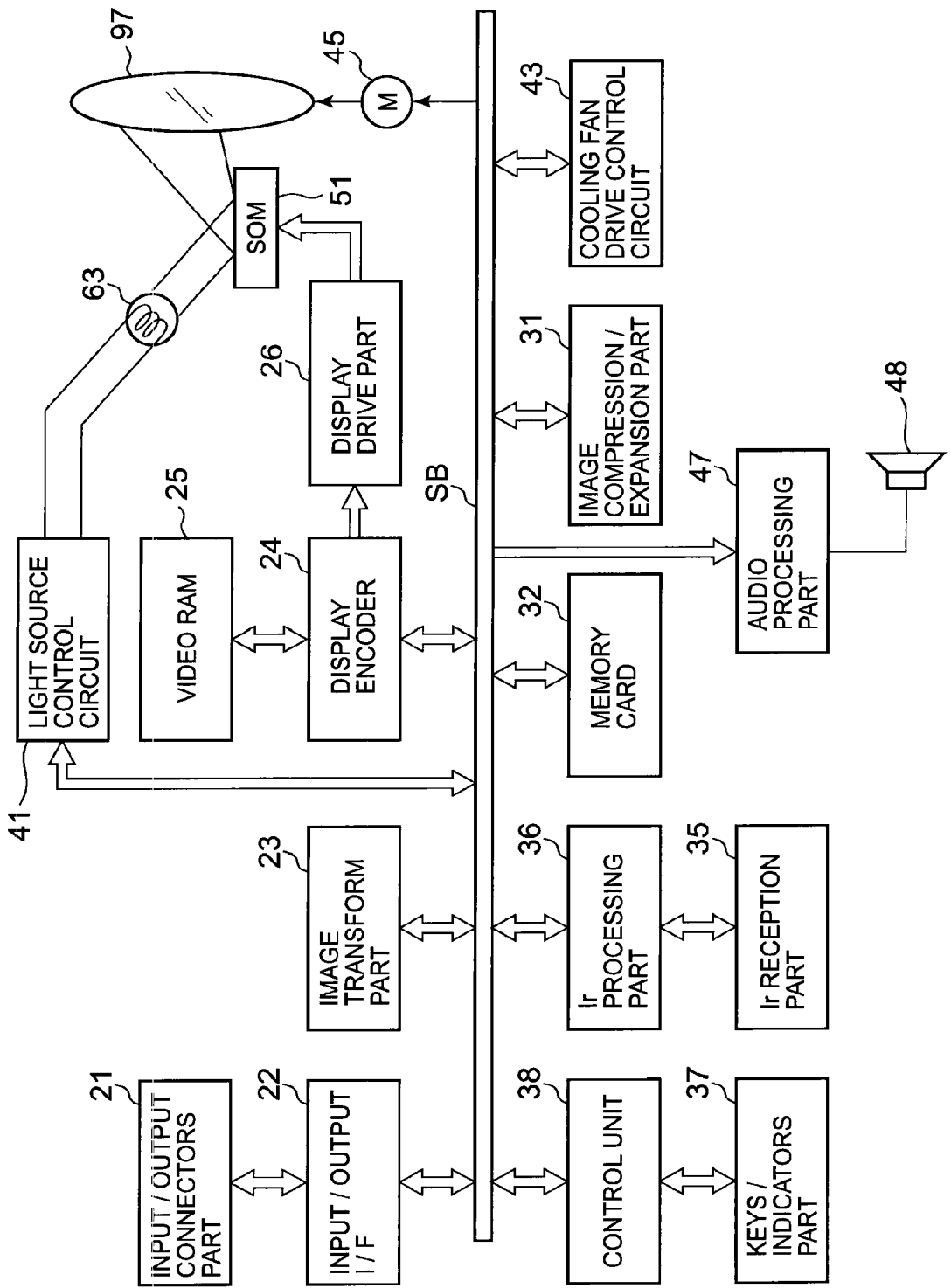
FIG. 7 is a block diagram of a functional circuit of the projector according to the embodiment of the invention.

Next, a projector control means of the projector 10 will be described by use of a block diagram in FIG. 7. The projector control means is made up of a control unit 38, an input/output interface 22, an image transform part 23, a display encoder 24, a display drive part 26 and the like. The control unit 38 is such as to govern operations of respective circuitries within the projector 10 and is made up of a CPU, a ROM which stores in a fixed fashion operation programs of various types of settings and a RAM which is used as a work memory.

Then, by this projector control means, image signals of various standards inputted from the input/output connectors part 21 are sent via the input/output interface 22 and a system bus (SB) to the image transform part 23 where the image signals are transformed so as to be unified into an image signal of a predetermined format suitable for display and are thereafter outputted to the display encoder 24.

In addition, the display encoder 24 deploys the image signal inputted thereinto on a video RAM 25 for storage and generates a video signal from the contents stored in the video RAM 25, outputting the video signal so generated to the display drive part 26.

The display drive part 26 drives a display device 51 which is a spatial optical modulator (SOM) at an appropriate frame rate in accordance with the image signal outputted from the display encoder 24. A light beam emitted from the light source device 63 is caused to enter the display device 51 via a light source side optical system to thereby form an optical image by reflected light from the display device 51, and the optical image so formed is then projected on to a screen, not shown, for display via a projection system lens group which is referred to as a projection side optical system. A movable lens group 97 of the projection side optical system is driven by a lens motor 45 for zooming or focusing.

In addition, an image compression/expansion part 31 performs a recording operation in which an intensity signal and a color-difference signal of the image signal are data compressed through processings such as ADCT and Huffman coding so as to write them sequentially on a memory card 32 which is referred to as a detachable recording medium. Further, when in a reproducing mode, the image compression/expansion part 31 reads out image data recorded on the memory card 32 and expands individual image data which make up a series of time-varying images frame by frame. The image compression/expansion part 31 then performs an operation in which the image data is outputted to the display encoder 24 via the image transform part 23 so as to enable the display of time-varying images based on the image data stored on the memory card 32.

Operation signals from the keys/indicators part 37 which is made up of the main keys and indicators provided on the upper side panel 11 of the main body case are sent directly to the control unit 38, while key operation signals from the remote controller are received by the Ir reception part 35, and a code signal demodulated at an Ir processing part 36 is outputted to the control unit 38.

In addition, a audio processing part 47 is connected to the control unit 38 via the system bus (SB). This audio processing part 47 includes a sound source circuit such as a PCM sound source. When in a projection mode and a reproducing mode, the audio processing part 47 converts audio data into analog signals and drives a speaker 48 to output loudly sound or audio based on the audio data.

In addition, the control unit 38 controls a light source control circuit 41, and this light source control circuit 41 controls the light source apparatus 63 so that light in a predetermined wavelength band is emitted from the light source apparatus 63 which is required when reproducing the image.

Specifically, when light in a wavelength band of red is required, the control unit 38 stops the illumination of the light emitting devices 205 of the light source unit 200, which will be described later and illuminates a light emitting device of the red light source 72. In addition, when light in a wavelength band of green is required, the control unit 38 illuminates the light emitting devices 205 of the light source unit 200 and controls the wheel motor 73 so as to position a green fluorescent area of the light emitting wheel 71 on the optical axes of the light emitting devices 205 of the light source unit 200. Further, when light in a wavelength band of blue is required, the control unit 38 illuminates the light emitting devices 205 of the light source unit 200 and controls the wheel motor 73 to position a diffuse transmission area of the light emitting wheel 71 on the optical axes of the light emitting devices 205 of the light source unit 200.

Further, the control unit 38 causes a cooling fan drive control circuit 43 to detect temperatures through a plurality of sensors which are provided in the light source apparatus 63 and the like so as to control the rotational speed of a cooling fan based on the results of the temperature detection. In addition, the control unit 38 also causes the cooling fan drive control circuit 43 to make the cooling fan continue to rotate even after the power supply of the projector main body is switched off by use of a timer or the like, or the control unit 38 controls the power supply to the projector main body to be cut off depending upon the results of the temperature detection by the temperature sensors.

Figure 8:
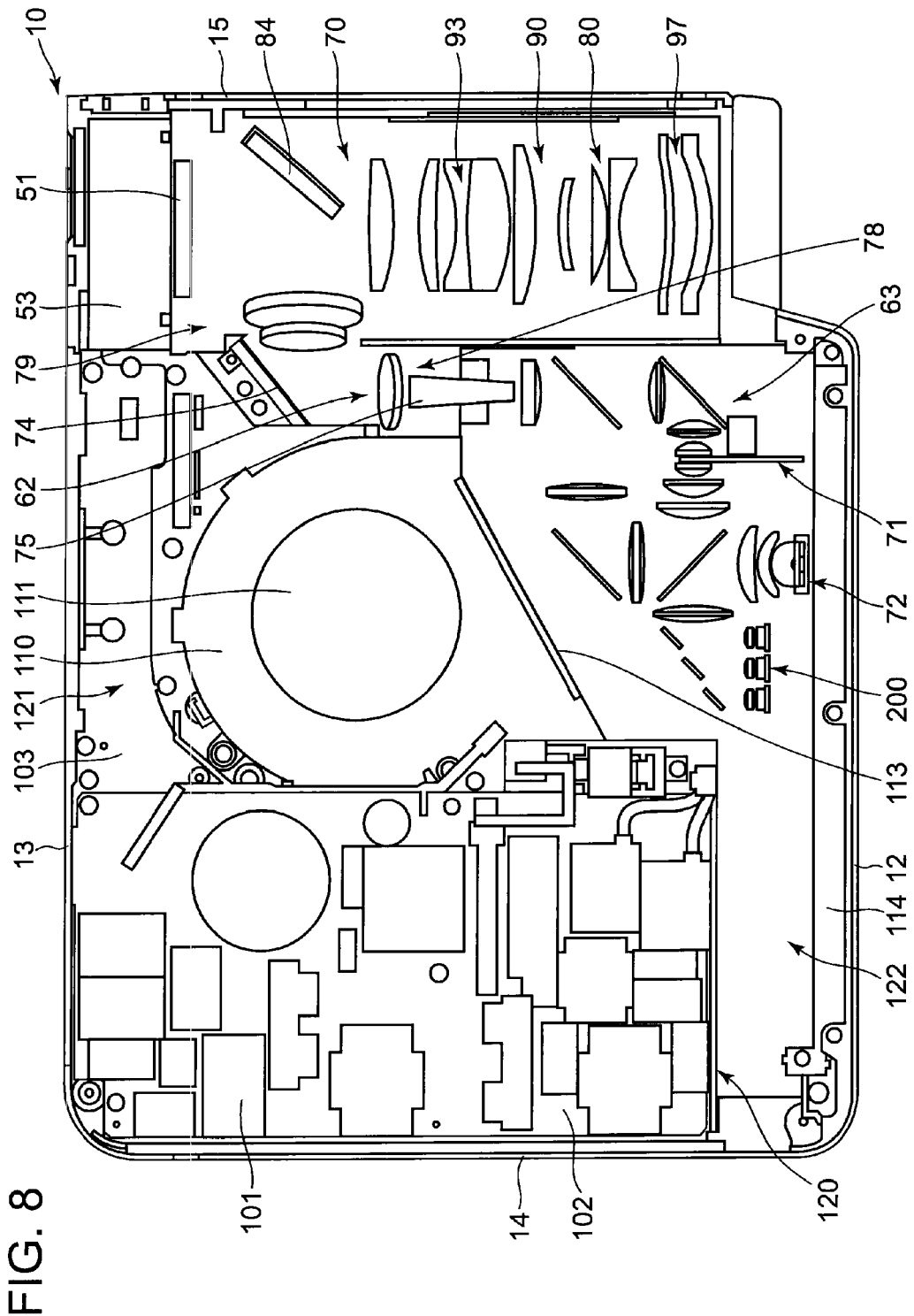
FIG. 8 is an exemplary plan view showing an interior construction of the projector according to the embodiment of the invention.

Next, an internal construction of the projector 10 will be described. FIG. 8 is an exemplary plan view showing an internal construction of the projector 10. As is shown in FIG. 8, in the projector 10, a power supply control circuit board 102 on which a power supply circuit block 101 and the like are mounted is disposed in proximity to the right-hand side panel 14 and a sirocco fan-type blower 110 is disposed substantially at a center in the projector 10. In addition, a control circuit board 103 is disposed in proximity to the blower 110, and the light source apparatus 63 is disposed in proximity to the front panel 12, an optical system unit 70 being disposed in proximity to the left-hand side panel 15.

In addition, an interior of a housing of the projector 10 is divided airtightly into an inlet side space compartment 121 which lies on the back panel 13 side and an outlet side space compartment 122 which lies on the front panel 12 side by a portioning bulkhead 120. The blower 110 is disposed so that its inlet port 111 is positioned in the inlet side space compartment 121 and its outlet port 113 is positioned on a boundary between the outlet side space compartment 122 and the inlet side space compartment 121.

The optical system unit 70 has a substantially U-shape and is made up of three blocks such as an illumination side block which is positioned in proximity to the light source apparatus 63, an image generation block 79 which is positioned on the back panel 13 side, and a projection side block 80 which is positioned between the illumination side block 78 and the left-hand side panel 15.

The illumination side block 78 includes part of a light source side optical system 62 which guides light emitted from the light source apparatus 63 to the display device 51 which is possessed by the image generation block 79. A light smoothing or light guiding device 75 for making a light beam emitted from the light source apparatus 63 into a light beam whose intensity is uniformly distributed and a light gathering lens which gathers light that has been transmitted through the light guiding device 75 are included in the light source side optical system 62 that is possessed by the illumination side block 78.

The image generating block 79 has, as the light source side optical system 62, an optical axis varying mirror 74 for varying a direction of an optical axis of the light beam emitted from the light guiding device 75, a plurality of light gathering lenses for gathering light reflected by the optical axis varying mirror 74 on to the display device 51 and a shining mirror 84 for shining the light beam that has been transmitted through the light gathering lenses on to the display device 51 at a predetermined angle. Further, the image generating block 79 includes a DML) which constitutes the display device 51, and a display device heatsink or cooling device 53 for cooling the display device 51 is disposed on a back panel 13 side of the display device 51 to thereby prevent the display device 51 from being heated to a high temperature.

The projection side block 80 has a lens group which makes up a projection side optical system 90 which projects light on to the screen which is reflected by the display device 51 to form an image. The projection side optical system 90 is made into a variable focus lens made up of a fixed lens group 93 which is incorporated in a fixed lens barrel and a movable lens group 97 which is incorporated in a movable lens barrel and having a zooming function. This variable focus lens enables zooming and focusing operations by moving the movable lens group 97 by a lens motor.

Figure 9:
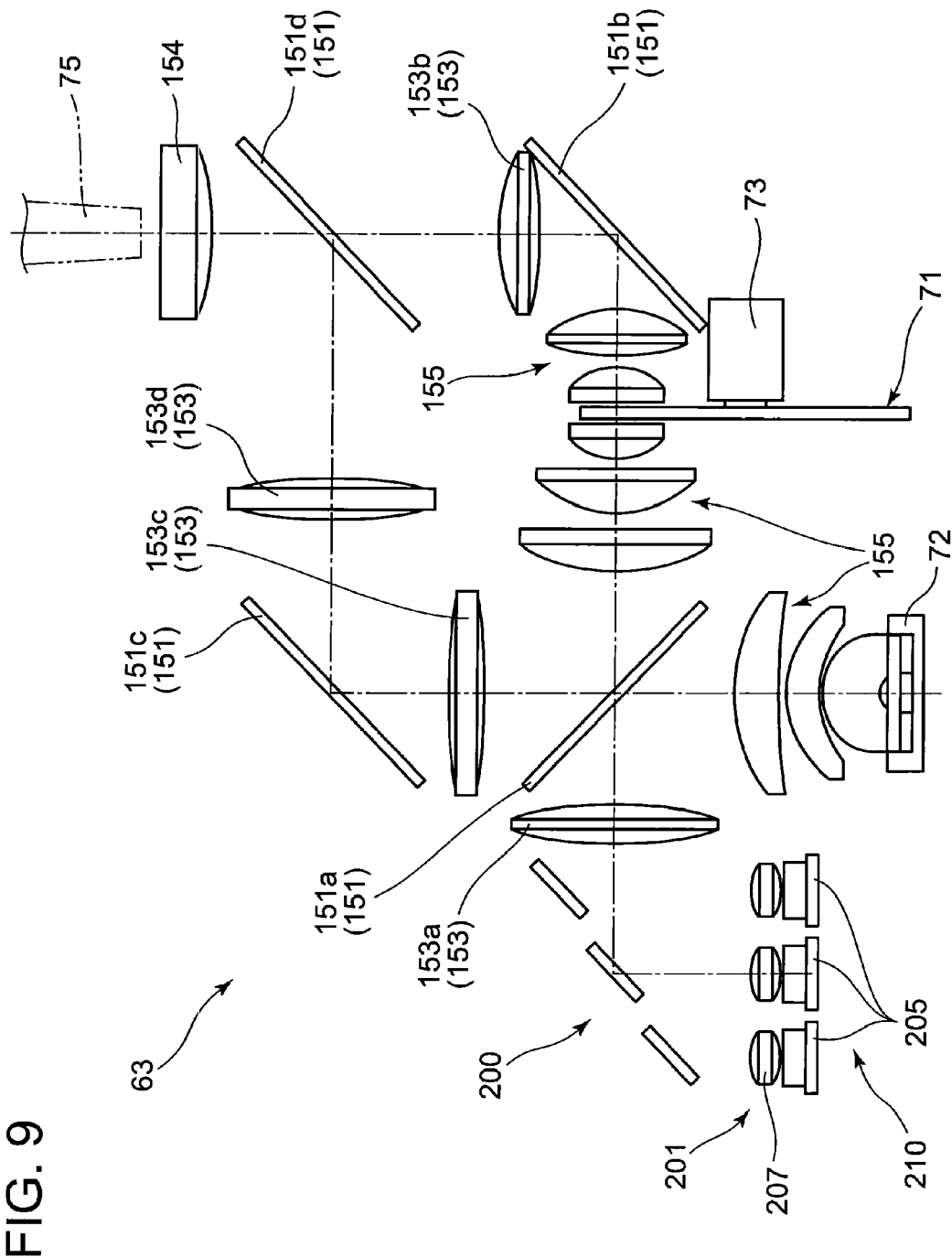
FIG. 9 is an exemplary plan view of a light source apparatus included in the projector according to the embodiment of the invention.

Next, the light apparatus 63 of the projector 10 will be described. FIG. 9 is a plan view of the light source apparatus 63. As is shown in FIG. 9, the light source apparatus 63 includes the light source unit 200 which is disposed so that a center line of the light guiding device 75 and an optical axis of light reflected on the primary reflecting mirror group 220 intersect each other at right angles, the light emitting wheel 71 which is disposed on an optical axis of the light source unit 200 so that the optical axis of the light source unit 200 and a rotating axis of the light emitting wheel 71 become parallel to each other, the wheel motor 73 for driving to rotate the light emitting wheel 71, the red light source 72 functioning as a single-color light emitting device which is disposed so that the optical axis of light reflected on the primary reflecting mirror group 220 of the light source unit 200 and an optical axis of the red light source 72 intersect each other at right angles, and a light gathering optical system for making an optical axis of a light beam emitted from the light emitting wheel 71 and an optical axis of a light beam emitted from the red light source 72 coincide with each other so that the light beams are gathered on to a predetermined plane.

As has been described above, the light source unit 200 includes the light source group 210 which includes, in turn, the plurality of light sources 201 which are each made up of the light emitting device 205 and the collimator lens 207 and the primary reflecting mirror group 220 which is disposed in front of the light source group 210 not only to vary the direction of the optical axis of the light beam from the light source group 210 through 90 degrees but also to reduce a cross-sectional area of the same light beam and emits blue laser light. In addition, the light source 201 is made up of a combination of a blue laser emitting device as the light emitting device 205 and the collimator lens 207 which is disposed in front of the light emitting device 205.

Figure 10:
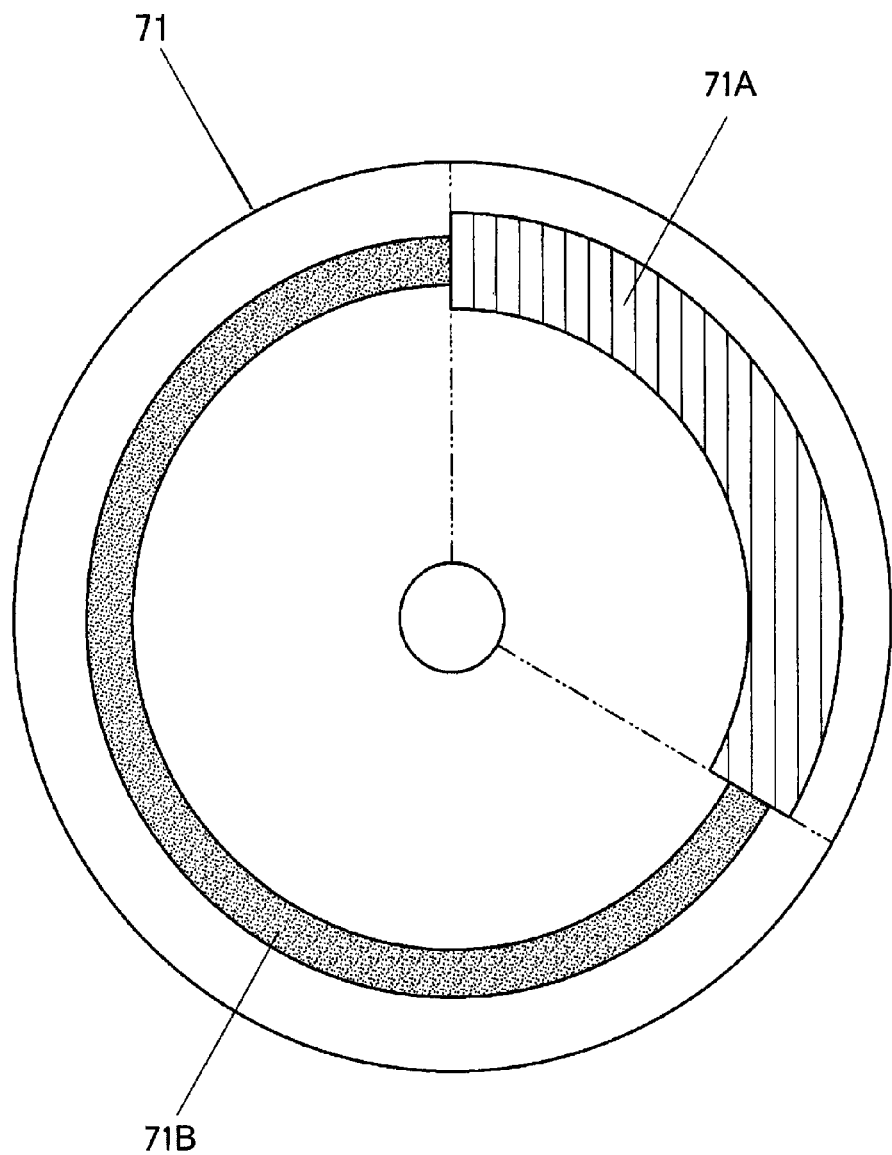
FIG. 10 is an exemplary diagram showing a diffuse transmission area and a fluorescent reflecting area of a light emitting wheel housed in the interior of the projector.

The light emitting wheel 71 (FIG. 10) is made up of at least a diffuse transmission area 71A which diffuses light emitted from the light source unit 200 and a fluorescent reflecting area 71B which includes a fluorescent material for emitting light in a predetermined wavelength band, the diffuse transmission area 71A and the fluorescent reflecting area 71B being provided end to end in a circumferential direction. Specifically, a green fluorescent material layer including a green fluorescent material is disposed on the fluorescent reflecting area 71B, and a surface of a portion of the light emitting wheel 71 where the green florescent material layer is disposed is made into a reflecting plane. In addition, the light emitting wheel 71 emits fluorescent light in a green wavelength band to the light source unit 200 side by light emitted from the light source unit 200 being shone on to the green fluorescent material layer thereon and emits diffused light in a blue wavelength band from a rear surface side thereof by light emitted from the light source unit 200 being shone on to a diffuse transmission layer laid out on the diffuse transmission area 71A.

The red light source 72 is a light emitting device such disposed as a red light emitting diode which emits red light and is disposed in a position lying between the light source unit 200 and the light emitting wheel 71 so that the optical axis thereof intersects light emitted from the light source unit 200 at right angles.

In addition, the light gathering optical system is made up of a mirror group 151, a convex lens group 153, a light gathering lens group 155 and a light guiding device incident lens 154. The mirror group 151 includes a primary mirror 151a which is disposed in a position where the optical axis of the light source unit 200 and the optical axis of the red light source 72 intersect each other at right angles, a secondary mirror 151b which is disposed on the rear surface side of the light emitting wheel 71 in a position where an extension of the center line of the light guiding device 75 and an extension of the optical axis of the light source unit 200 intersect each other at right angles, a tertiary mirror 151c which is disposed on the optical axis of the red light source 72 and a quaternary mirror 151d which is disposed in a position where an optical axis of light in the red wavelength band which is reflected on the tertiary mirror 151c and an extension of the center line of the light guiding device 75 intersect each other at right angles.

The primary mirror 151a is made into a dichroic mirror which transmits light in the blue wavelength band and light in the red wavelength band and reflects light in the green wavelength band. In addition, the secondary mirror 151b is made into a reflecting mirror which makes the optical axis of light in the blue wavelength band which is transmitted through the light emitting wheel 71 while being diffused and an optical axis of the light guiding device 75 coincide with each other. The tertiary mirror 151c is made into the reflecting mirror which reflects light in the red wavelength band and light in the green wavelength band towards the quaternary mirror 151d. The quaternary mirror 151d is made into a dichroic mirror which transmits light in the blue wavelength band and reflects light in the red wavelength band and light in the green wavelength band.

In addition, the convex lens group 153 as the light gathering optical system includes a primary convex lens 153a which is disposed between the light source unit 200 and the primary mirror 151a, a secondary convex lens 153b which is disposed between the secondary mirror 151b and the quaternary mirror 151d, a tertiary convex lens 153c which is disposed between the primary mirror 151a and the tertiary mirror 151c, and a quaternary convex lens 153d which is disposed between the tertiary mirror 151c and the quaternary mirror 151d.

Further, the light gathering lens group 155 as the light gathering optical system is disposed in proximity to the red light source 72 and in proximity to both front and rear surfaces of the light emitting wheel 71 for gathering light emitted from the red light source 72 and the light emitting wheel 71. In addition, the light guiding device incident lens 154 as the light gathering optical system is disposed in proximity to the light guiding device 75 for gathering light in the red wavelength band, light in the green wavelength band and light in the blue wavelength band which are emitted from the light source apparatus 63 on to an incident plane of the light guiding device 75.

In addition, in the light source apparatus 63 which is configured in the way described heretofore, blue laser light emitted from the light source unit 200 is gathered by the primary convex lens 153a, is thereafter transmitted through the primary mirror 151a and is shone on to the fluorescent reflecting area and the diffuse transmission area on the light emitting wheel 71 by the gathering lens group 155. A light beam emitted from the light source unit 200 and shone on to the fluorescent reflecting area functions as excitation light to excite the fluorescent material, whereby the fluorescent material emits light in the green wavelength band. In addition, a light beam emitted from the light source unit 200 and shone on to the diffuse transmission area on the light emitting wheel 71 is diffused to thereby be converted in nature from coherent light into incoherent light and is then emitted from the rear surface side of the light emitting wheel 71 as light in the blue wavelength band of the incoherent light.

In addition, light in the red wavelength band that is emitted from the red light source 72 is gathered by the light gathering lens group 155 and is transmitted through the primary mirror 151a. Light in the green wavelength band that is emitted from the light emitting wheel 71 in the direction of where the light source unit 200 is positioned is gathered by the light gathering lens group 155 so as to be shone on to the primary mirror 151a. Then, the light in the red wavelength band that has been transmitted through the primary mirror 151a and the light in the green wavelength band that has been reflected on the primary mirror 151a are gathered by the tertiary convex lens 153c and the quaternary convex lens 153d while being reflected on the tertiary mirror 151c and the quaternary mirror 151d and are then gathered on to the incident plane of the light guiding device 75 by the light guiding device incident lens 154 to thereby be incident or enter an interior of the light guiding device 75. Further, the light in the blue wavelength band that has been transmitted through the light emitting wheel 71 while being diffused is gathered by the light gathering lens group 155 to thereby be shone on to the secondary mirror 151b, is reflected on the secondary mirror 151b, is gathered at the secondary convex lens 153b and is transmitted through the quaternary mirror 151d. Thereafter, the light in the blue wavelength band is gathered on to the incident plane of the light guiding device 75 by the light guiding device incident lens 154 to enter the interior of the light guiding device 75.

In this way, the light source apparatus 63 can emit light in the wavelength of red, light in the wavelength of green and light in the wavelength of blue, which constitute the three primary colors of light. Consequently, by controlling the light emitting devices 205 of the light source unit 200, the red light source 72 and the light emitting wheel 71 by the light source control circuit 41, the projector 10 of the embodiment can emit light in the desired wavelength bands for forming an image, and light beams in those wavelength bands are reflected towards the projection side optical system 90 by the display device 51 as image constituent elements, whereby a projection of a color image can be implemented.

According to the light source device 63 according to the embodiment, since the light source unit 200, which shines light as excitation light and light in the blue wavelength band on to the light emitting wheel 71, can emit the light beam which is high in luminance, small in cross-sectional area of the light beam and high in density in the way described above, the light source apparatus 63 can be utilized as the light source apparatus 63 in the projector 10 which can project an image which is high in luminance and lightness.

In addition, according to the light source apparatus 63 of the embodiment, by adopting the configuration in which the blue laser light emitting devices are used as the light emitting devices 205 of the light source unit 200, light in the green wavelength band is made to be emitted from the fluorescent reflecting area on the light emitting wheel 71, light in the blue wavelength band is made to be emitted from the diffuse transmission area on the light emitting wheel 71 and light in the red wavelength band is made to be emitted from the independent red light source 72, since the luminance and lightness of light beams in the respective wavelength bands can be made substantially uniform, an occurrence of a difference in lightness in an image to be projected can be prevented when an image is projected by the projector 10.

In addition, according to the projector 10 which includes the light source apparatus 63 that has been described heretofore, an image can be projected which is high in luminance and lightness and in which luminance and lightness are made uniform in light in all the wavelength bands.

According to the invention, it becomes possible to provide the light source unit which can reduce the cross-sectional areas of the light beams which are emitted from the plurality of bright points by narrowing the intervals between the light beams emitted from the respective light sources by the mirrors in the configuration in which the plurality of light sources are arranged into the planar configuration, the light source apparatus which includes the light emitting wheel which utilizes light emitted from the light source unit as excitation light and light in the predetermined wavelength band and the small and thin projector which includes the light source apparatus.

In addition, the invention is not limited to the embodiments that have been described above, and hence, the invention can be modified variously without departing from the spirit and scope of the invention when it is carried out. Additionally, the functions which are executed in the aforesaid embodiments may be combined together to an extreme extent for execution thereof. Various approaches for varying the direction of the optical axis are included in the embodiments that have been described above, and inventions can be extracted variously depending upon appropriate combinations of the plurality of disclosed constituent features. For example, provided that the advantage can still be obtained even in the event that some constituent features are deleted from the whole constituent features descried in the embodiments, such a configuration from which those constituent features are deleted can be extracted as an invention.

What is claimed is:
1. A light source apparatus comprising:
a light source unit comprising (i) a light source group in which a plurality of light sources are arranged into rows and columns so as to form a planar configuration, and (ii) a primary reflecting mirror group disposed on an optical axis of the light source group to reflect light beams emitted from the light source group as light beams which are reduced in a column direction by narrowing intervals between the rows of light beams emitted from the light source group;
a light emitting wheel disposed on an optical axis of a light beam emitted from the light source unit;
a wheel motor for driving to rotate the light emitting wheel;
a single-color light emitting device;
a light gathering optical system for making an optical axis of a light beam emitted from the light emitting wheel and an optical axis of a light beam emitted from the single- color light emitting device coincide with each other so that the light beams are gathered onto a predetermined plane;

wherein the light emitting wheel includes at least a diffuse transmission area which diffuses light emitted from the light source unit and a fluorescent reflecting area which includes a fluorescent material which emits light in a predetermined wavelength band, the diffuse transmission area and the fluorescent reflecting area being provided end to end in a circumferential direction.

2. A light source apparatus as set forth in claim 1, wherein light emitted from each of the light sources of the light source group is parallel light;

wherein the primary reflecting mirror group comprises a plurality of reflecting mirrors which are disposed on optical axes of the light beams emitted from the individual rows of light sources in the light source group in a step-like fashion; and wherein the reflecting mirrors are disposed so as to eliminate intervals between reflected light reflected from the reflecting mirrors.

3. A light source apparatus as set forth in claim 1, further comprising:

a secondary reflecting mirror group which is disposed on optical axes of the light beams reflected on the primary reflecting mirror group to reflect the light beams emitted from the light sources after the emitted light beams have been reflected on the primary reflecting mirror group, as light beams whose cross-sectional areas are reduced in a row direction by narrowing intervals of the columns of light beams emitted from the light sources which make up the columns of the light source group.

4. A light source apparatus as set forth in claim 1, wherein each of the light sources comprises a combination of a light emitting device and a collimator lens which converts light emitted from the light emitting device into parallel light.

5. A light source apparatus as set forth in claim 1, wherein the light sources of the light source unit are blue laser light emitting devices;

wherein the fluorescent material of the fluorescent reflecting area is a green fluorescent material; and wherein the single-color light emitting device is a red light emitting diode.

6. A projector comprising:
the light source apparatus set forth in claim 1;
a light guiding device;
a light source side optical system;
a display device;
a projection side optical system; and
projector control means;
wherein the light gathering optical system of the light source apparatus gathers the light beams onto an incident plane of the light guiding device.

7. A light source apparatus as set forth in claim 2, wherein the primary reflecting mirror group comprises a number of strip-like reflecting mirrors which is the same as a number of the rows of light sources in the light source group; and wherein the reflecting mirrors are disposed so as to be inclined at a same angle and so as to be parallel to a direction of the rows of light sources in the light source group.

8. A light source apparatus as set forth in claim 2, wherein the primary reflecting mirror group comprises a number of reflecting mirrors which is the same as a number of the light sources in the light source group; and wherein the reflecting mirrors are disposed on optical axes of the light sources of the light source group and so as to be inclined at a predetermined angle with respect to the optical axes.

9. A light source apparatus as set forth in claim 3, wherein the secondary mirror group comprises strip-like reflecting mirrors which are disposed on optical axes of the light beams emitted from the individual columns of light sources in the light source group and reflected on the primary reflecting mirror group, in a step-like fashion; and wherein the reflecting mirrors are disposed so as to eliminate intervals between reflected light reflected from the individual reflecting mirrors.

* * * * *